United States Patent Office

2,962,344
Patented Nov. 29, 1960

2,962,344

DEODORIZING OF GASES

Hans Heinrich Kurmeier, Tinsdaler Heideweg 91,
Hamburg-Rissen, Germany

No Drawing. Filed Jan. 13, 1959, Ser. No. 786,448

10 Claims. (Cl. 23—2)

This invention is concerned with improvements in or relating to the deodorizing of gases, and is more particularly concerned with the deodorizing of the evil-smelling exhaust gases given off by animal and/or vegetable protein drying plants, such as fish drying plants for the production of fish meal.

The drying apparatus used in such plants generally exhausts large amounts of air which is saturated with water and contains volatile odorous compounds. Such odorous compounds are, in part, present in the raw material which is submitted to the drying operation, but the major proportion thereof are formed during heating of the raw material in the drying apparatus. A fish meal drier of conventional construction having a capacity of, for example, 100 metric tons of raw material per 24 hours will normally exhaust, per hour, approximately 10,000 cubic meters of air, 1,000 kg. of water and 500–1,000 gms. of odorous compounds, that is the exhaust gases contain from 500–1,000 milligrams of such odorous compounds per cubic meter of gas.

Chemical analysis of the exhaust gases from such animal and/or vegetable protein drying plants has shown that they contain, inter alia, ammonia, trimethylamine, secondary amines, guanidine, a variety of amino-acids and lower fatty acids. The actual compounds within this group and their relative proportions with respect to one another in any particular exhaust gas vary widely and are dependent of the nature of the raw material which is treated. For example, the exhaust gases from flaying plants contain only small quantities of trimethylamine and large quantities of ammonia, higher amines of the cadaverine and scatole type and smaller quantities of lower fatty acids and of still unidentified sulphur-containing compounds. The exhaust gases from the so-called "drumdriers" which are increasingly used for drying fish solubles in fish meal plants, have a particularly evil odor which is caused by unidentified compounds together with those which are normally present in the exhaust gases from fish meal driers.

In general it may be said therefore that the exhaust gases from animal and/or vegetable drying plants contain more or less large quantities of volatile amino-acids and lower fatty acids, together with a large excess of basic volatile compounds and a smaller proportion of still unidentified sulphur-containing compounds; as a result of the presence of the large excess of basic volatile compounds in such exhaust gases, the latter have a strongly alkaline reaction. The content of pure trimethylamine, which is responsible for the characteristic odor of fish, in such exhaust gases is insignificant and its odor is harmless compared with that of such exhaust gases as a whole.

The emission of such evil-smelling exhaust gases into the atmosphere from animal and/or vegetable protein drying plants has for many years given rise to a problem of some magnitude. Such exhaust gases are a source of nuisance and trouble to the neighborhood of such plants as, among other things, they are deleterious to health and lead to a reduction in the value of land and property adjacent to such plants. Many proposals have been made with a view to mitigating or removing this nuisance but none have been wholly successful; while certain of such proposals have been effective in deodorizing such exhaust gases they have been too expensive to be economically practicable, and other proposals, while being economic, have not been sufficiently efficient.

It is an object of the present invention, therefore, to provide a simple and economic process for the deodorizing of the exhaust gases from animal and/or vegetable protein drying plants.

According to the present invention there is provided a process for deodorizing the exhaust gases from animal and/or vegetable protein drying plants which comprises mixing said exhaust gases with acidic flue gases and then washing the mixed gases with water in a corrosion-resistant scrubbing tower.

It has been found that this process efficiently deodorizes such evil-smelling exhaust gases, the basic compounds present in the latter reacting with the acidic compounds present in the flue gases to form salts which are readily soluble in the wash water and which, owing to their negligible vapour pressure in aqueous solution, are not volatilized therefrom by contact of the solution with further amounts of the mixed gases. The acidic compounds present in the exhaust gases are liberated from the salts or salt-like compounds they form with the basic compounds of the exhaust gases by the action of the stronger acids present in the flue gases and, together with the sulphur-containing compounds present in the exhaust gases, are adsorbed by the soot or other finely divided solid material which is always present in the flue gases and are then eliminated by washing.

Suitable acidic flue gases for use in the processes according to the invention are those produced by oil or coal-fired boilers or by sulphur ovens; mixtures of two or more of these gases may be employed. In addition, the acidic flue gases may, if desired, contain added sulphur-dioxide.

The exhaust gases and the acidic flue gases may be mixed and the mixed gases then passed on to the scrubbing tower. It is however preferred that mixing of the exhaust gases and the acidic flue gases should be effected in the lower part of the corrosion-resistant scrubbing tower, the mixed gases being washed with water in the upper part of the scrubbing tower. As the gases in such a scrubbing tower are not at very high temperatures, the latter may be sufficiently protected against corrosion by having its interior painted with paints which are resistant to not very corrosive acids. The scrubbing tower may be of any suitable design and its upper part will normally be filled with suitable packing in order to improve contact between the mixed gases and the wash water. The washed gas passing out of the scrubbing tower in the lower part of which the exhaust gases and the acid flue gases are mixed may, if desired, be passed through one or more further scrubbing towers where it is further washed with water.

The wash water employed in the first scrubbing tower may contain chlorine or chlorine dioxide. Alternatively or, in addition, the quantity of acidic flue gases mixed with the exhaust gases may be such that the former contain an excess of acid components with respect to the basic components of the latter, whereby the wash water is acidified.

In order that the invention may be more fully understood, the following example is given by way of illustration only:

EXAMPLE

In this example a comparison is made between the exhaust gas given off by a fish meal drying plant prior to adaptation to incorporate the process according to the invention and after such adaptation.

*Prior to adaptation*

8,000 cubic metres per hour of exhaust gas were exhausted by the fish meal drier at a temperature of 212° F., the exhaust gas was pre-washed in a two-stage scrubber with 150 cubic metres per hour of chlorinated water whereby its temperature was reduced to 86° F. and the washed exhaust gas was exhausted into the atmosphere through a chimney which was 13 metres high.

1 cubic metre of the washed exhaust gas was withdrawn from the chimney by means of a small extractor pump and was bubbled slowly through 200 ml. of slightly acidified distilled water having a pH of 6. The acidified water was then made up to 250 ml. by the addition of further distilled water and a 50 ml. portion thereof was distilled after the addition thereto of an excess of strong alkali, the volatile basic compounds removed by distillation being absorbed in N/100 aqueous sulphuric acid; 11.7 ml. of N/100 aqueous sulphuric acid were required to absorb the volatile basic compounds.

The exhaust gas emitted from the chimney prior to adaptation was very evil-smelling and caused a nuisance over a distance of some miles. Similarly the acidified water through which the sample of the exhaust gas had been bubbled smelled strongly of greatly putrified fish. From the above titration it can be calculated that the quantity of basic odorous compounds emitted from the chimney prior to adaptation of the drier, expressed in terms of trimethylamine, was 276 gms. trimethylamine per hour.

*After adaptation*

The fish meal drying plant was modified by incorporating a scrubbing tower between the fish meal drier and the chimney. This scrubbing tower was of square internal cross-section (2 metres x 2 metres) and was 5 metres high, and was arranged for mixing of gases in its lower part and scrubbing of the mixed gases in its upper part.

8,000 cubic metres per hour of exhaust gas from the fish meal drier were pre-washed with 150 cubic metres per hour of chlorinated water as described above and were then mixed with 2,000 cubic metres per hour of the acidic flue gases from an oil-fired boiler in the lower part of the scrubbing tower. The mixed gases were washed in the upper part of the tower with 20 cubic metres per hour of chlorinated water and the washed gases were exhausted to the atmosphere through the chimney.

1 cubic metre of the washed mixed gases was withdrawn from the chimney and manipulated exactly as described above. It was found that:

2.0 ml. of N/100 aqueous sulphuric acid were required to absorb the volatile basic compounds.

The washed mixed gases emitted from the chimney were completely free of objectionable odors and were almost invisible in the atmosphere. The temperature of the emitted gases was 86° F.; no nuisance was created to the neighborhood of the plant. It can be calculated from the above titration that the quantity of basic odorous compounds emitted from the chimney after adaptation of the drier, expressed in terms of trimethylamine, was 59 gms. trimethylamine per hour.

Scrubbing with only 20 cubic metres per hour of chlorinated water in the scrubbing tower had thus removed 78.8% of the basic odorous compounds, the remainder of the latter being exhausted from the chimney in the form of odorless salts. This remainder could be further reduced or eliminated by the use of one or more additional scrubbing towers or by use of a column of an ionic exchanger. The use of such ionic exchangers can be performed on this place without any great expense, because the amount of salts which are to be removed from the emissions is insignificant. All species of ionic exchangers which are able to exchange the rest of cations and/or anions in the humid gases can be employed.

Of course the application of such ionic exchangers theoretically could be performed on the odorous gases leaving the driers or the prewashers, but the amount of the volatile alkalines and salts here is so large, that this process would be too expensive with regard to the costs of the apparatus, the exchangers and the chemicals for the regeneration of the exhausted exchangers.

It will be appreciated from the foregoing that the present invention provides a simple and effective means of eliminating or substantially reducing the nuisance arising from the evil-smelling gases exhausted by fish meal and other animal and/or vegetable protein drying plants. The process is cheap to operate, the major cost of the process, apart from the initial cost of the scrubbing tower, being the running cost of an extractor for supplying the acidic flue gases to the scrubbing tower. For a fish meal plant with a capacity of 500 metric tons of fish or fish offal per day, the energy consumed by the flue gas extractor is of the order of 15 kwh. A further advantage of the process according to the invention is that it serves to eliminate the soot and sulphur dioxide from the acid flue gases employed.

Having described my invention, I claim:

1. A process for deodorizing the exhaust gases of fish, animal, and vegetable protein drying plants, which gases normally contain basic volatile odorous compounds having a strongly alkaline reaction, comprising: mixing said exhaust gases with a quantity of acidic flue gas sufficient to react with a major proportion of said odorous compounds to form products which can be separated from the gas mixture by washing; and then washing the gas mixture with water.

2. The process of claim 1 in which the flue gas contains finely divided soot.

3. The process of claim 1 in which the flue gas includes added sulfur dioxide.

4. The process of claim 1 in which the wash water contains a member selected from the group consisting of chlorine and chlorine dioxide.

5. The process of claim 1 in which the flue gas is provided by an oil fired boiler.

6. The process of claim 1 in which the flue gas is provided by a coal fired boiler.

7. The process of claim 1 in which the exhaust gases are washed with water prior to mixing with the flue gas.

8. The process of claim 1 in which the washed exhaust gases are further contacted with an ion exchange material to remove remaining volatile ionic components.

9. The process of claim 1 in which the amount of flue gas mixed with the exhaust gases is sufficient to provide an excess of acidic flue gas components whereby the wash is rendered acid.

10. A process for deodorizing the exhaust gases of fish, animal, and vegetable protein drying plants, which gases normally contain basic volatile odorous compounds having a strongly alkaline reaction, comprising: mixing said exhaust gases with a quantity of acidic flue gas sufficient to react with a major proportion of said odorous compounds to form products which can be separated from the gas mixture by washing, said mixing being carried out in the lower part of a corrosion-resistant scrubbing tower; and then washing the mixed gases with water in the upper part of said scrubbing tower.

References Cited in the file of this patent

UNITED STATES PATENTS

| 1,854,428 | Segerfelt | Apr. 19, 1932 |
| 2,829,028 | Aho et al. | Apr. 1, 1958 |